(12) United States Patent
Santos et al.

(10) Patent No.: US 10,899,003 B2
(45) Date of Patent: Jan. 26, 2021

(54) SYSTEMS AND METHODS FOR TENDON-DRIVEN ROBOTIC MECHANISMS

(71) Applicant: THE REGENTS OF THE UNIVERSITY OF CALIFORNIA, Oakland, CA (US)

(72) Inventors: Veronica J. Santos, Woodland Hills, CA (US); Randall Blake Hellman, Chandler, AZ (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 287 days.

(21) Appl. No.: 16/013,041

(22) Filed: Jun. 20, 2018

(65) Prior Publication Data

US 2019/0001487 A1    Jan. 3, 2019

Related U.S. Application Data

(60) Division of application No. 14/676,658, filed on Apr. 1, 2015, now Pat. No. 10,029,364, which is a continuation of application No. PCT/US2013/063249, filed on Oct. 3, 2013.

(60) Provisional application No. 61/709,296, filed on Oct. 3, 2012, provisional application No. 61/709,300, filed on Oct. 3, 2012.

(51) Int. Cl.
*B25J 9/10* (2006.01)
*B25J 15/00* (2006.01)
*B25J 17/00* (2006.01)
*B25J 13/08* (2006.01)
*B25J 9/16* (2006.01)

(52) U.S. Cl.
CPC ........... *B25J 9/1045* (2013.01); *B25J 9/1625* (2013.01); *B25J 13/085* (2013.01); *B25J 15/0009* (2013.01); *B25J 17/00* (2013.01); *Y10S 901/09* (2013.01); *Y10S 901/21* (2013.01); *Y10T 29/49845* (2015.01); *Y10T 74/20* (2015.01); *Y10T 74/20329* (2015.01)

(58) Field of Classification Search
CPC ..... B25J 9/1045; B25J 13/085; B25J 15/0009
See application file for complete search history.

(56) References Cited

U.S. PATENT DOCUMENTS

| | | | |
|---|---|---|---|
| 2,493,776 A | 1/1950 | Pecorella | |
| 5,080,682 A * | 1/1992 | Schectman | A61F 2/583 294/111 |
| 5,200,679 A | 4/1993 | Graham | |
| 6,494,662 B1 | 12/2002 | De Montalembert | |

(Continued)

FOREIGN PATENT DOCUMENTS

| | | | | |
|---|---|---|---|---|
| CA | 2500005 A1 * | 4/2004 | ........... | C25D 11/005 |
| WO | 9824074 A1 | 6/1998 | | |

OTHER PUBLICATIONS

Korean Intellectual Property Office (KIPO), International Search Report and Written Opinion dated Jan. 23, 2014, related PCT international application No. PCT/US2013/063249, pp. 1-9, claims searched, pp. 10-13.

*Primary Examiner* — Terence Boes
(74) *Attorney, Agent, or Firm* — O'Banion & Ritchey LLP; John P. O'Banion

(57) ABSTRACT

Systems and methods for an actuation system including a plurality of single actuation units for modular control of a tendon-driven robotic mechanism are disclosed.

8 Claims, 13 Drawing Sheets

(56) References Cited

U.S. PATENT DOCUMENTS

| | | | |
|---|---|---|---|
| 10,449,677 B1* | 10/2019 | Al Najjar | B25J 15/0009 |
| 2007/0035143 A1* | 2/2007 | Blackwell | B25J 15/0009 |
| | | | 294/111 |
| 2007/0219668 A1* | 9/2007 | Takahashi | B25J 9/1612 |
| | | | 700/249 |
| 2007/0236162 A1* | 10/2007 | Kawabuchi | B25J 15/0009 |
| | | | 318/568.16 |
| 2010/0011900 A1 | 1/2010 | Burbank | |
| 2010/0243357 A1 | 9/2010 | Yim | |
| 2011/0040408 A1* | 2/2011 | De La Rosa Tames | |
| | | | B25J 9/1045 |
| | | | 700/258 |
| 2011/0241368 A1* | 10/2011 | Kurita | B25J 15/0009 |
| | | | 294/213 |
| 2011/0288681 A1* | 11/2011 | Hayakawa | B25J 15/0009 |
| | | | 700/245 |
| 2013/0253705 A1 | 9/2013 | Goldfarb | |
| 2017/0217014 A1 | 8/2017 | Riviere | |

\* cited by examiner

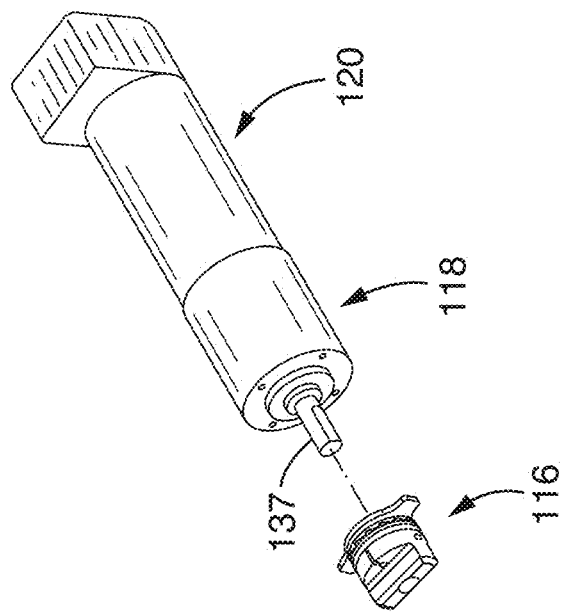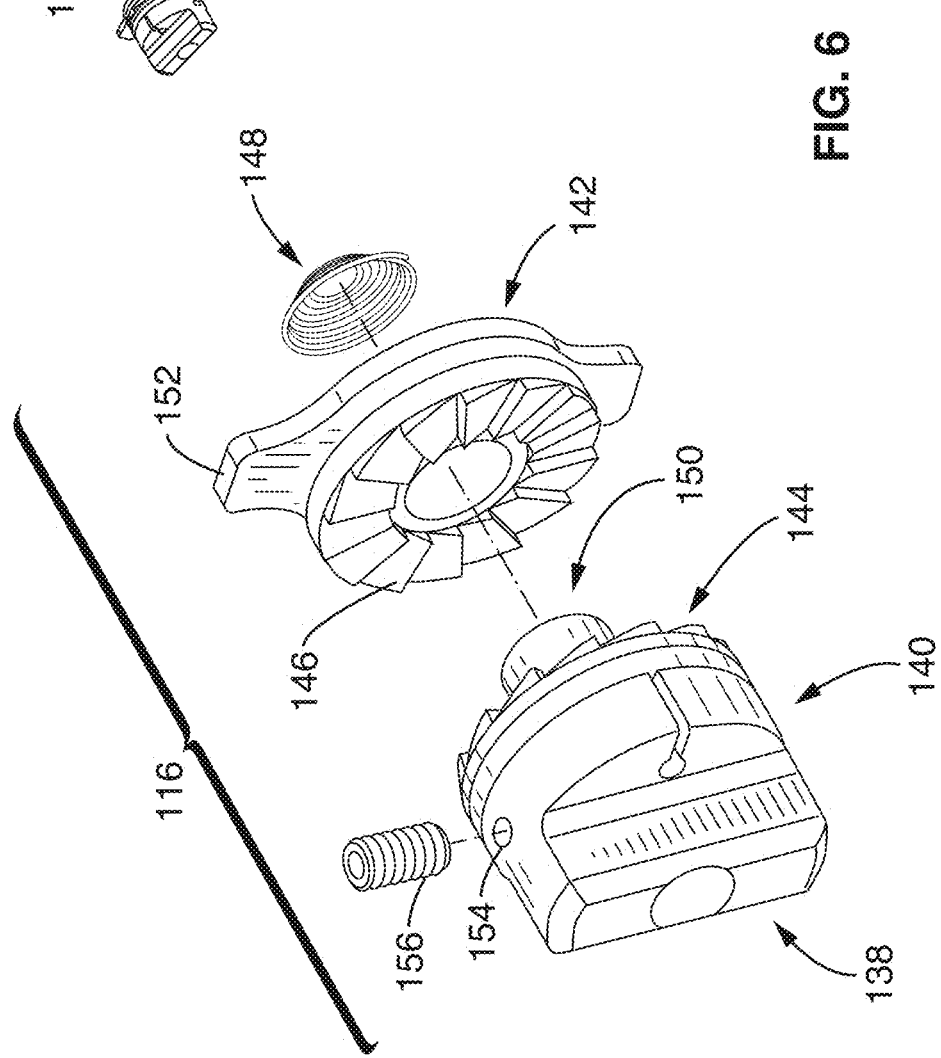
FIG. 6

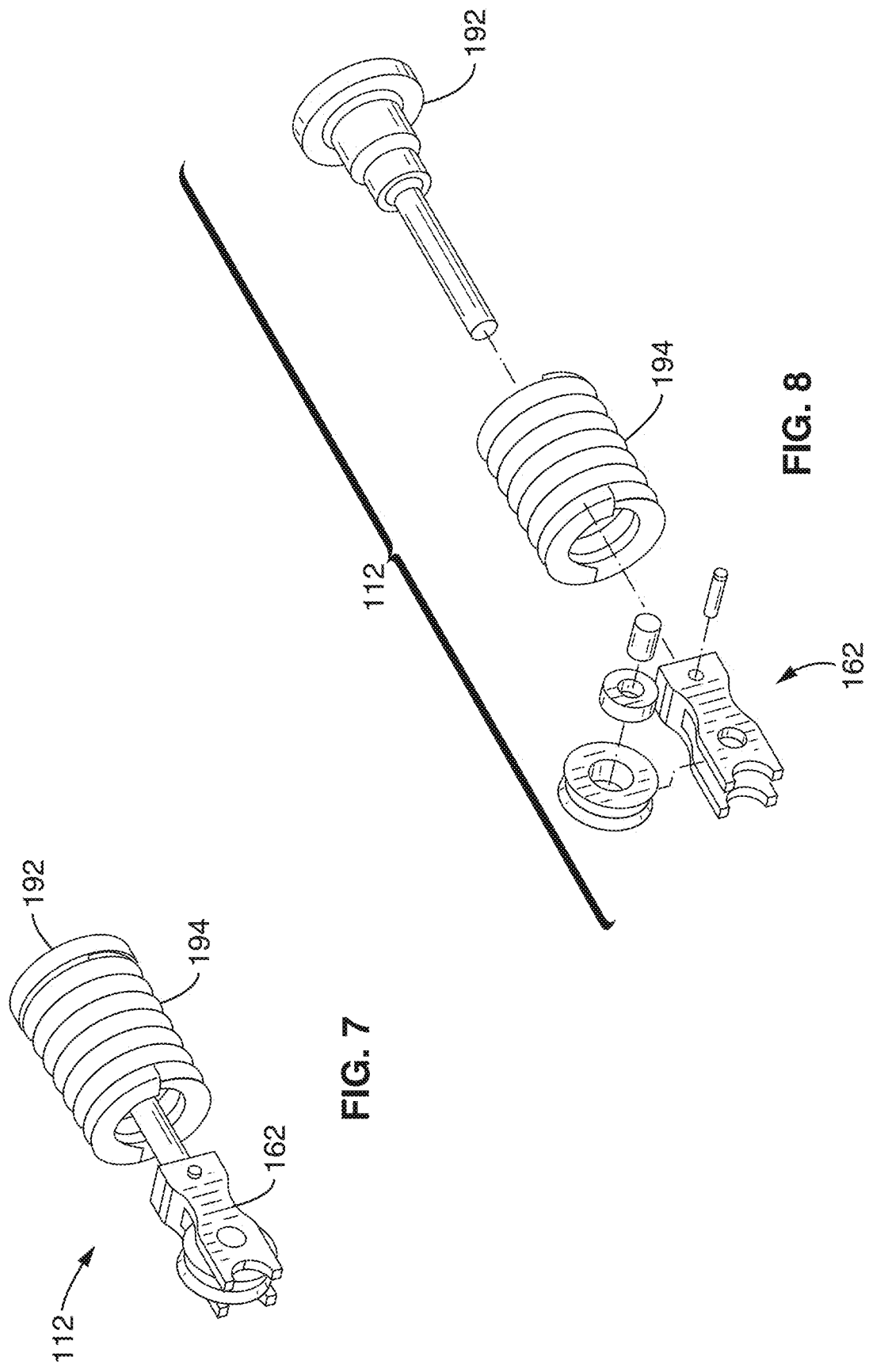

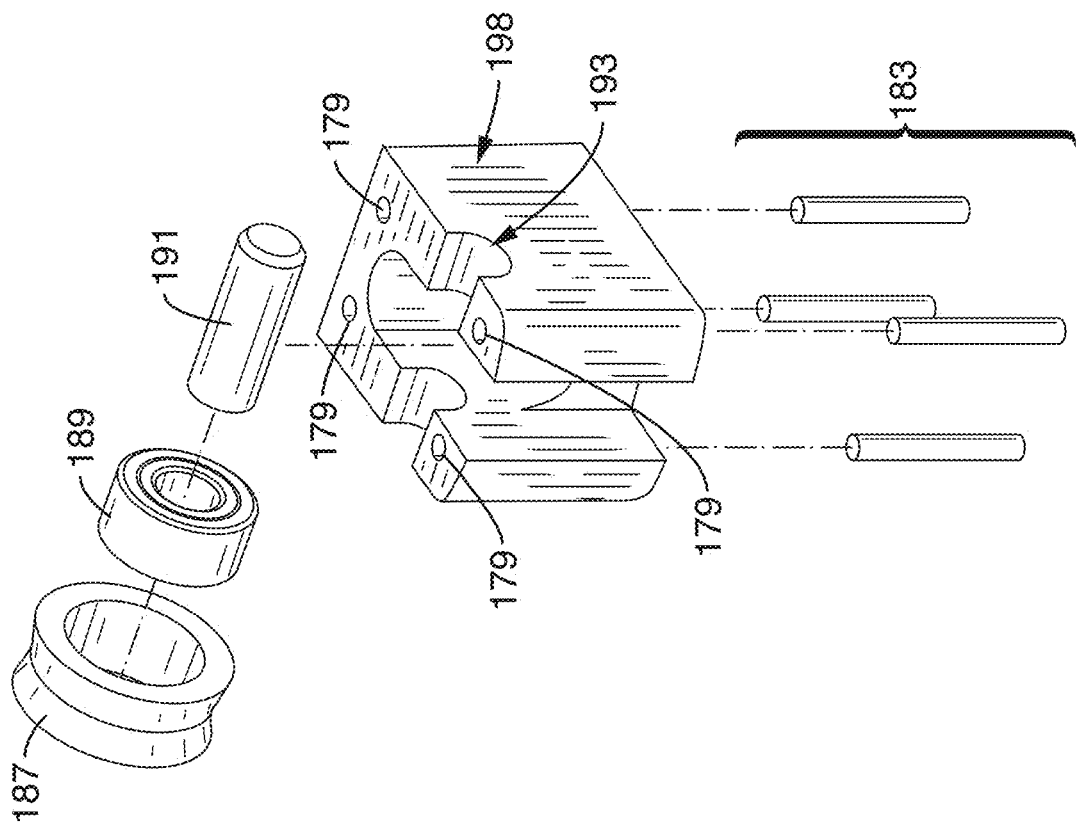
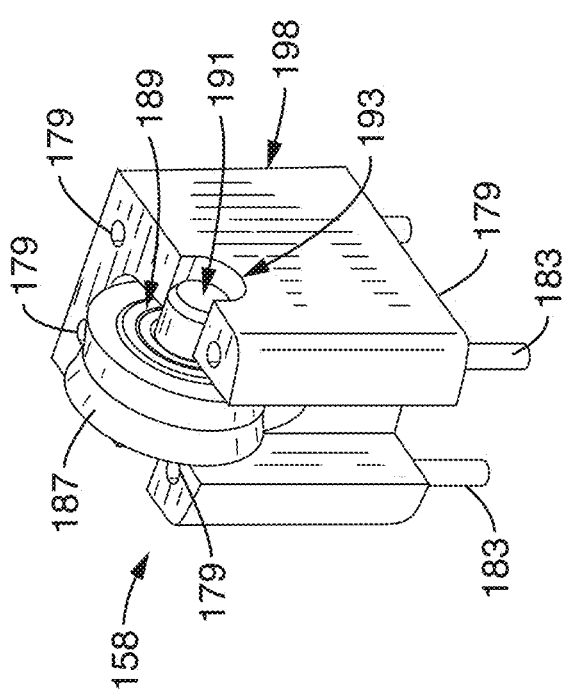

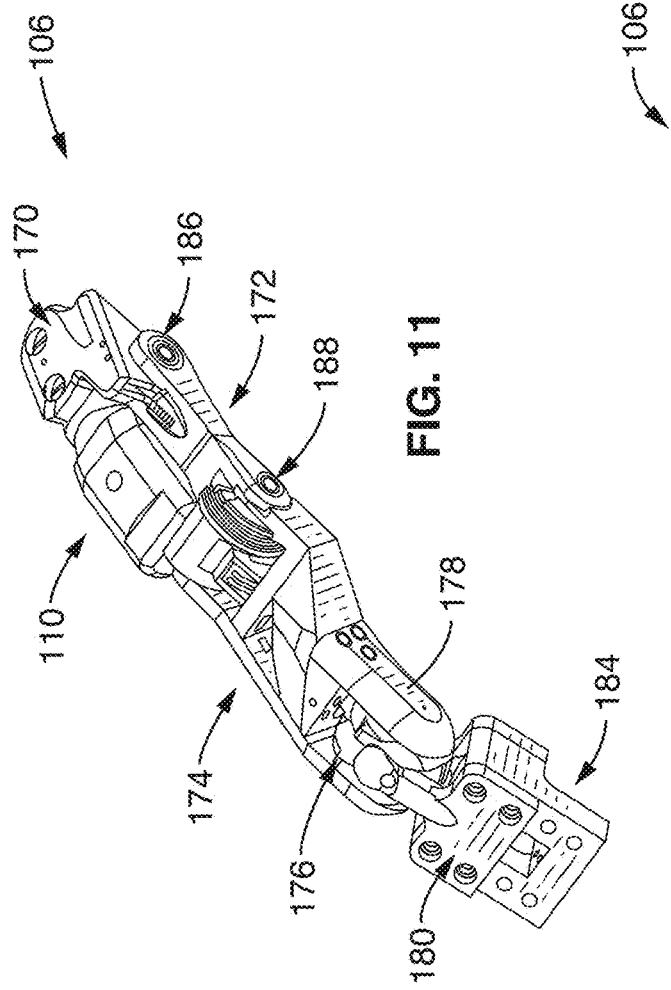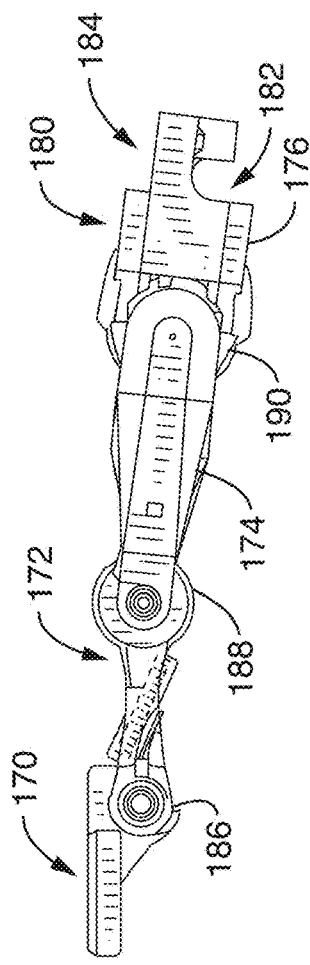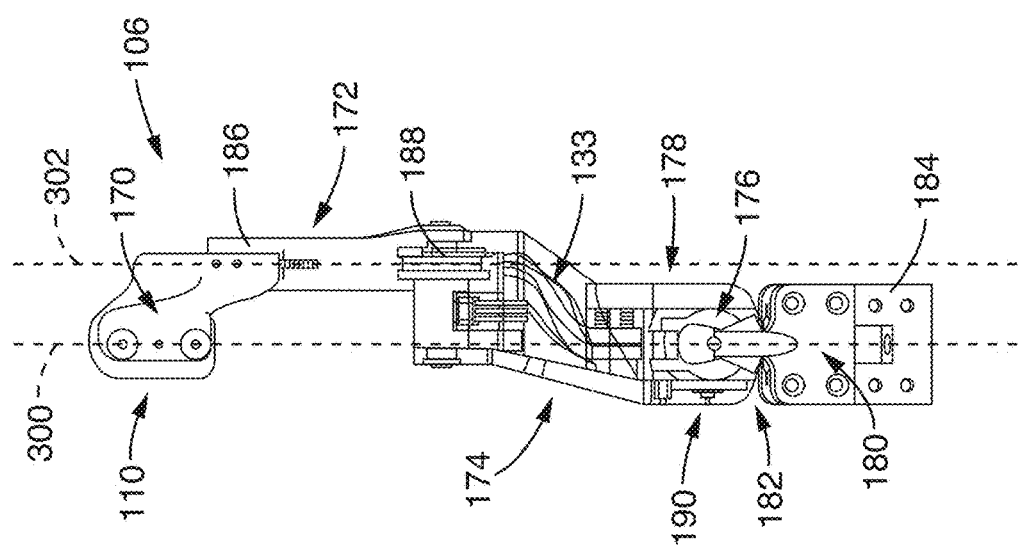

SYSTEMS AND METHODS FOR TENDON-DRIVEN ROBOTIC MECHANISMS

CROSS-REFERENCE TO RELATED APPLICATIONS

This application is a division of U.S. patent application Ser. No. 14/676,658 filed on Apr. 1, 2015, incorporated herein by reference in its entirety, which is a 35 U.S.C. § 111(a) continuation of PCT international application number PCT/US2013/063249 filed on Oct. 3, 2013, incorporated herein by reference in its entirety, which claims priority to, and the benefit of, U.S. provisional patent application Ser. No. 61/709,296 filed on Oct. 3, 2012, incorporated herein by reference in its entirety, and U.S. provisional patent application Ser. No. 61/709,300 filed on Oct. 3, 2012, incorporated herein by reference in its entirety. Priority is claimed to each of the foregoing applications.

STATEMENT REGARDING FEDERALLY SPONSORED RESEARCH OR DEVELOPMENT

This invention was made with government support under Grant Numbers 0932389, 0954254, 1208519, 1461547, and 1463690 awarded by the National Science Foundation. The government has certain rights in the invention.

FIELD

The present document relates generally to systems and methods for robotic mechanisms, and in particular, to an actuation system for controlling tendon-driven robotic mechanisms.

BACKGROUND

The design of human-sized artificial hands is challenged by the relatively small volume available for sensor, actuator, and plant components. An intrinsic actuation approach (e.g., with motors in the fingers and palm) results in a compact and elegant form, but often at the expense of finger motion and force production capabilities. When both strength and speed are desired, an extrinsic actuation can be taken similar to that of the human hand. In addition to smaller intrinsic muscles in the palm, powerful extrinsic muscles in the forearm transmit torques to finger joints through tendons and extensor hoods that pass over the joints. For practical reasons, many robotic hands have actuation systems located proximal to the wrist and rely on cables to transmit torque related to the articulation of finger joints. Such tendon-driven designs have been used for robotic hands, prosthetic hands, and complex, anthropomorphic systems. Although actuation systems for such tendon-driven designs have been satisfactory for their intended use, there is still a need in the art for improvements in actuation systems for tendon-driven robotic mechanisms.

SUMMARY

In an embodiment, an actuation unit for controlling a tendon-driven robotic mechanism may include a motor having an output shaft in operative engagement with a ratchet mechanism. The ratchet mechanism is engaged to a pair of tendons, wherein one of the pair of tendons is a flexor tendon and another one of the pair of tendons is an extensor tendon in which the flexor tendon and the extensor tendon control the articulation of one or more joints of the robotic mechanism. In addition, the pair of tendons is in operative engagement with a tension mechanism having a biasing arrangement for applying and maintaining a predetermined degree of tension to the pair of tendons.

In one embodiment, an actuation system includes an actuation unit for controlling a tendon-driven robotic mechanism. The actuation unit may include an output shaft in operative engagement with a ratchet mechanism. The ratchet mechanism is engaged to a pair of tendons, wherein one of the pair of tendons is a flexor tendon and another one of the pair of tendons is an extensor tendon in which the flexor tendon and the extensor tendon control the articulation of one or more joints of the robotic mechanism. In addition, each of the pair of tendons is in operative engagement with a strain gauge mechanism, which includes a cantilevered feature for enabling direct measurement of tension being applied to the pair of tendons through one or more strain gauges that measure the degree of deflection of the cantilevered feature.

In another embodiment, an actuation system includes an actuation unit for controlling a tendon-driven robotic mechanism. The actuation unit may include an output shaft in operative engagement with a ratchet mechanism. The ratchet mechanism is engaged to a pair of tendons, wherein one of the pair of tendons is a flexor tendon for movement in a first direction and another one of the pair of tendons is an extensor tendon for movement in an opposite second direction in which the flexor tendon and the extensor tendon control the articulation of one or more joints of the robotic mechanism. In addition, the pair of tendons is in operative engagement with a pulley system for redirecting the pair of tendons from a first orientation to a second orientation such that the pair of tendons is in parallel relation to each other.

In yet another embodiment, an actuation system may include a plurality of actuation units for controlling a tendon-driven robotic mechanism, wherein each of the actuation units includes a motor having an output shaft in operative engagement with a ratchet mechanism. The ratchet mechanism is engaged to a pair of tendons, wherein one of the pair of tendons is a flexor tendon for movement in a first direction and another one of the pair of tendons is an extensor tendon for movement in an opposite second direction in which the flexor tendon and the extensor tendon control the articulation of one or more joints of the robotic mechanism. In addition, the actuation unit further includes a first stage pulley system engaged to a first length of the pair of tendons in a cantilevered arrangement for allowing direct measurement of tension being applied to the pair of tendons, a second stage pulley system engaged to a second length of the pair of tendons for applying and maintaining a predetermined degree of tension to the pair of tendons, and a third stage pulley system engaged to a third length of the pair of tendons for redirecting the pair of tendons from a first orientation to a second orientation such that the pair of tendons are in parallel relation to each other.

In a further embodiment, an actuation unit may include a base plate having a motor mounted thereon having an output shaft in operative engagement with a ratchet mechanism. The ratchet mechanism is engaged to a pair of tendons, wherein one of the pair of tendons is a flexor tendon for movement in a first direction and another one of the pair of tendons is an extensor tendon for movement in an opposite second direction in which the flexor tendon and the extensor tendon control the articulation of one or more joints of the robotic mechanism. In addition, the actuation unit further includes a first stage pulley system engaged to a first length of the pair of tendons for allowing direct measurement of tension being applied to the pair of tendons, wherein the first pulley system includes a cantilever feature in operative association with one or more strain gauges that measure the degree of deflection of the cantilever feature for measuring a degree of tension being applied to the pair of tendons.

In an embodiment, a robotic mechanism may include a robotic body having a plurality of interconnected phalanxes and one or more joints that articulate one phalanx relative to another phalanx. The plurality of phalanxes may include at least one asymmetrical phalanx engaged to at least one symmetrical phalanx, wherein the symmetrical phalanx defines a longitudinal axis along a center line of the robotic body and the asymmetrical phalanx defines a longitudinal axis offset from and parallel to the center line of the robotic body. In some embodiments, a sensor may be attached to the asymmetrical phalanx such that the sensor is oriented along the center line of the robotic body.

In one embodiment, a method of manufacturing an actuation unit may include:
 mounting a motor having an output shaft to a base plate;
 engaging the output shaft to a ratchet mechanism;
 engaging a pair of tendons to the ratchet mechanism along a first portion of the pair of tendons and to the robotic mechanism along a second length of the pair of tendons, and
 forming a cantilevered feature along the base plate; and engaging the pair of tendons to the cantilevered feature and associating one or more strain gauges with the cantilevered feature for enabling direct measurement of any tension being applied to the pair of tendons.

Additional objectives, advantages and novel features will be set forth in the description which follows or will become apparent to those skilled in the art upon examination of the drawings and detailed description which follows.

BRIEF DESCRIPTION OF THE DRAWINGS

FIG. 6 is an exploded view of a ratchet mechanism of the single actuation unit of FIG. 4;

FIG. 7 is a perspective view of a tensioning mechanism of the single actuation unit of FIG. 4;

FIG. 8 is an exploded view of the tensioning mechanism of FIG. 7;

FIG. 9 is a perspective view of a pulley system for the single actuation unit of FIG. 4;

FIG. 10 is an exploded view of the pulley system of FIG. 9;

FIG. 11 is a perspective view of the robotic mechanism of FIG. 1;

FIG. 12 is a top view of the robotic mechanism of FIG. 11;

FIG. 13 is a side view of the robotic mechanism of FIG. 11;

Corresponding reference characters indicate corresponding respective elements among the views of the drawings. The headings used in the figures should not be interpreted to limit the scope of the claims.

DESCRIPTION

Figure 1:
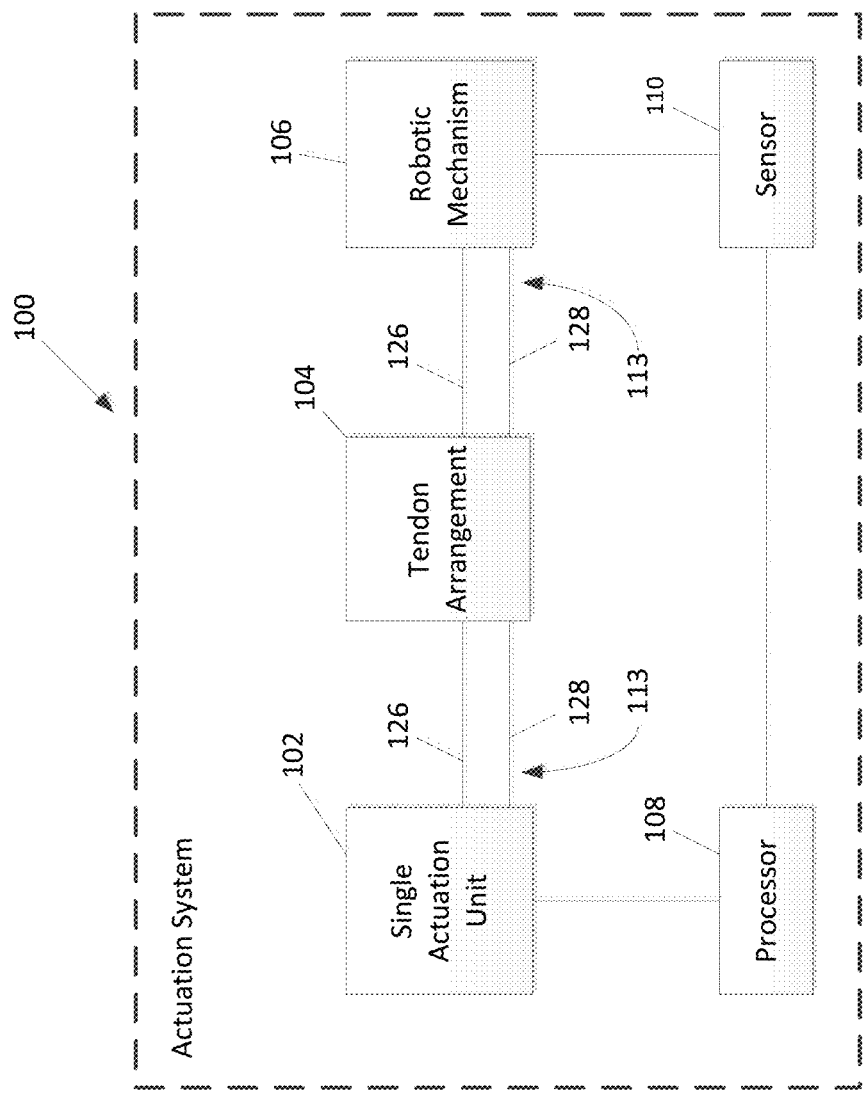
FIG. 1 is a simplified block diagram of one embodiment of a single actuation system having an actuation unit in operative engagement with a robotic mechanism through a tendon arrangement.

As described herein, embodiments of an actuation system for a tendon-driven robotic mechanism having one or more single actuation units each having a pulley arrangement and cantilevered feature for directly measuring the degree of tension being applied to a plurality of tendons connected between the actuation unit and the robotic mechanism, a tension mechanism for applying and maintaining a predetermined degree of tension to the plurality of tendons, and a router mechanism for routing the plurality of tendons from a first orientation to a second orientation such that each of the plurality of tendons are in parallel relation to each other.

Referring to the drawings, embodiments of an actuation system are illustrated and generally indicated as 100 in FIGS. 1-16. In some embodiments, the actuation system 100 may include a single actuation unit 102 (FIG. 1) for controlling the operation of a robotic mechanism 106, or a plurality of single actuation units 102 (FIG. 3) combined together in which each actuation unit 102 controls the operations and various articulations of the robotic mechanism 106 through a respective tendon arrangement 104 as shall be discussed in greater detail below.

Referring to FIG. 1, in some embodiments the actuation system, designated 100, may include an actuation unit 102 operatively engaged to a tendon arrangement 104 for controlling the operation of the robotic mechanism 106. In particular, the tendon arrangement 104 may include a plurality of tendons 113 arranged in pairs with each pair of tendons 113 having a flexor tendon 126 for movement in a first direction A and an extensor tendon 128 for movement in an opposite second direction B in order to control the various articulations of a robotic mechanism 106. In some embodiments, a single pair of tendons 113 may be actuated by the actuation unit 102, while in other embodiments multiple pairs of tendons 113 may be actuated by the actuation unit 102. In some embodiments, the tendon arrangement 104 may further include low friction tubing (not shown) configured to encase each tendon 113 in a coaxial relationship and permit substantially friction-free or low friction movement of the flexor tendon 126 and extensor tendon 128 through the tubing during operation of the actuation unit 102. In some embodiments, a sheath (not shown) may enclose the low friction tubing. In one embodiment, the actuation unit 102 is in operative engagement with a single pair of tendons 113, although in other embodiments, the actuation unit 102 may be in operative engagement with multiple pairs of tendons 113 that control the articulations of the robotic mechanism 106. In some embodiments, the tendons 113 may be in the form of a cable, a wire, or a thread. In some embodiments, the tendons 113 may be made from a metal material, a plastic material or any type of resilient composite material that permits tension to be applied to each tendon 113.

In some embodiments, the actuation unit 102 includes a processor 108 for controlling the operation of the robotic mechanism 106. For example, the processor 108 may perform one or more of the following limitations: receive and process data from the actuation unit 102 related to the amount of tension being applied to each pair of tendons 113; transmit instructions to each actuation unit 102 for manipulating each respective pair of tendons 113 to control the articulation of the robotic mechanism 106; and process data received from the sensor 110 attached to the robotic mechanism 106.

In some embodiments, the robotic mechanism 106 includes a sensor 110 for providing the processor 108 with data related to various sensor measurements. For example, the sensor 110 may be a joint angle encoder sensor for measuring fingertip velocity, an on-off contact sensor for providing binary measure of contact, a tactile array sensor for measuring pressure or displacement distribution, a force/torque sensor for measuring force and torque forces, and a dynamic tactile sensor for measuring the artificial skin acceleration and stress rate for slip detection. However, other types of sensors 110 used for artificial grasping and manipulation by the robotic mechanism 106 are also contemplated. The apparatus, methods and articles of manufacture are not limited in this regard.

Figure 2:
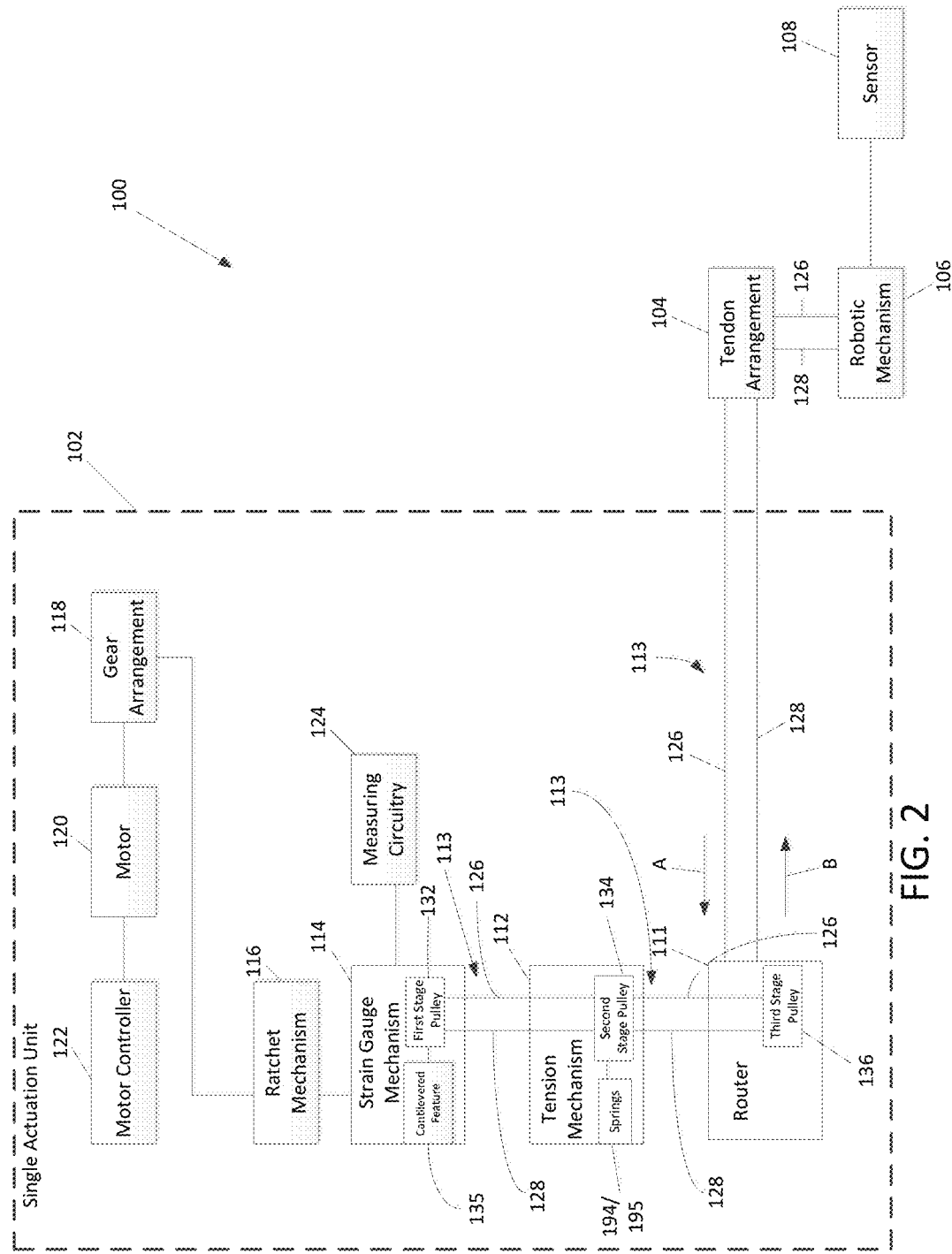
FIG. 2 is a simplified block diagram of the embodiment of the actuation system of FIG. 1 showing the various components of a single actuation unit.
Figure 3:
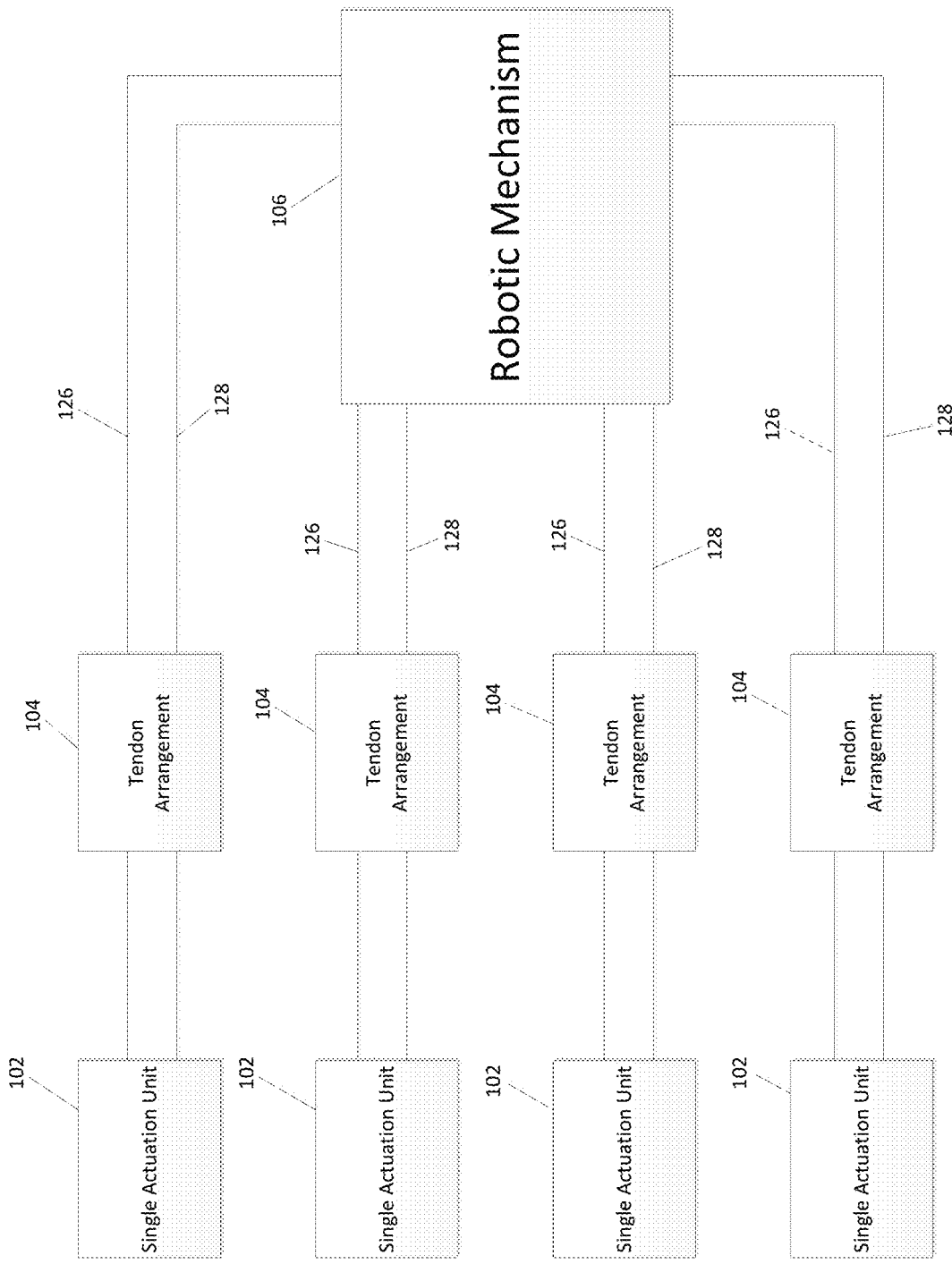
FIG. 3 is a simplified block diagram showing an actuation system having a plurality of single actuation units.

Referring to FIG. 2, in one embodiment, the actuation unit 102 includes a motor controller 122 for controlling the operation of a motor 120 that drives the operation of the robotic mechanism 106 through movement of a plurality of tendons 113. The motor 120 includes an output shaft 137 (FIG. 6) that is operatively engaged to a ratchet mechanism 116 through a gear arrangement 118, for example, a planetary gear arrangement. In one embodiment, the ratchet mechanism 116 is secured to one end of a respective pair of tendons 113 and allows for quick preloading of the tendons 113 to the actuation unit 102 in order to spool any extra length of tendon 113 such that a predetermined length of tendon 113 is established between the actuation unit 102 and the robotic mechanism 116.

Referring to the exploded view of FIG. 6, the ratchet mechanism 116 is coupled to an output shaft 137 of the motor 120. In some embodiments, the ratchet mechanism 116 includes a first split output shaft 140 having a first set of teeth 144 engaged to a second set of teeth 146 defined by a second split output shaft 142. The first and second sets of teeth 144 and 146 are configured to engage each other such that rotational movement of the first split output shaft 140 is permitted in a first rotational direction and prevented in a second rotational direction relative to the second split output shaft 142. In some embodiments, the ratchet mechanism 116 includes a conical spring 148 for providing a spring bias to the ratchet mechanism 116 during the ratcheting operation. The first split output shaft 140 includes an axial extension 150 configured to engage a center opening 152 defined through the second split output shaft 142 for aligning and connecting together the two output shafts 140 and 142 during assembly. In addition, the first split output shaft 140 defines a channel 154 configured to receive a set screw 156 for securing the output shaft 137 of the motor 120 to the ratchet mechanism 116. As shown, the first split output shaft 140 includes a handle 138 that allows an individual to rotate the ratchet mechanism 116 when spooling the extra length of tendon 113.

Figure 4:
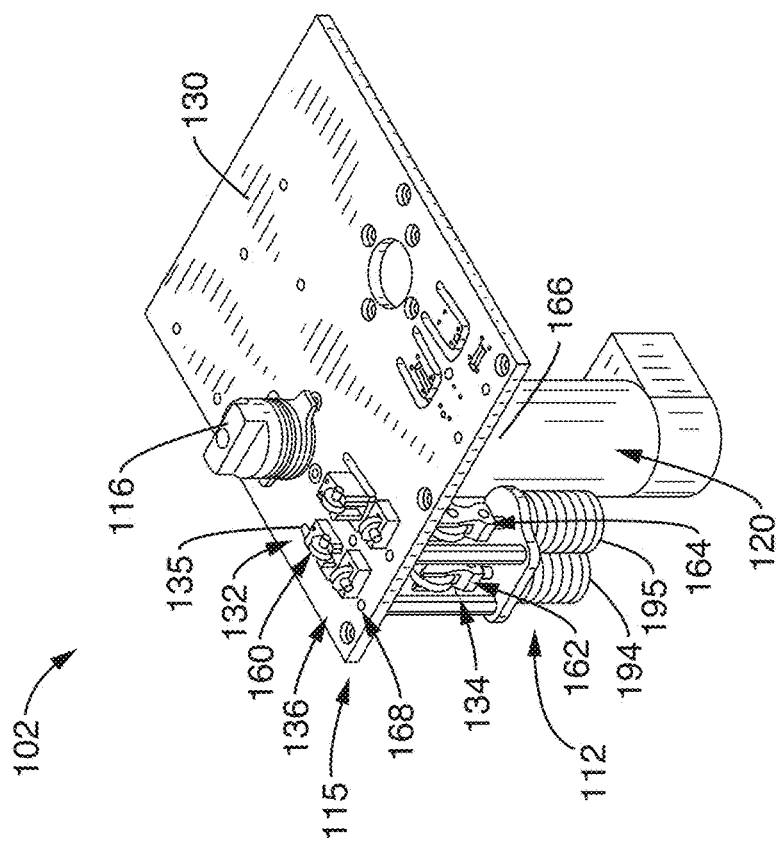
FIG. 4 is a perspective view of the single actuation unit.
Figure 14:
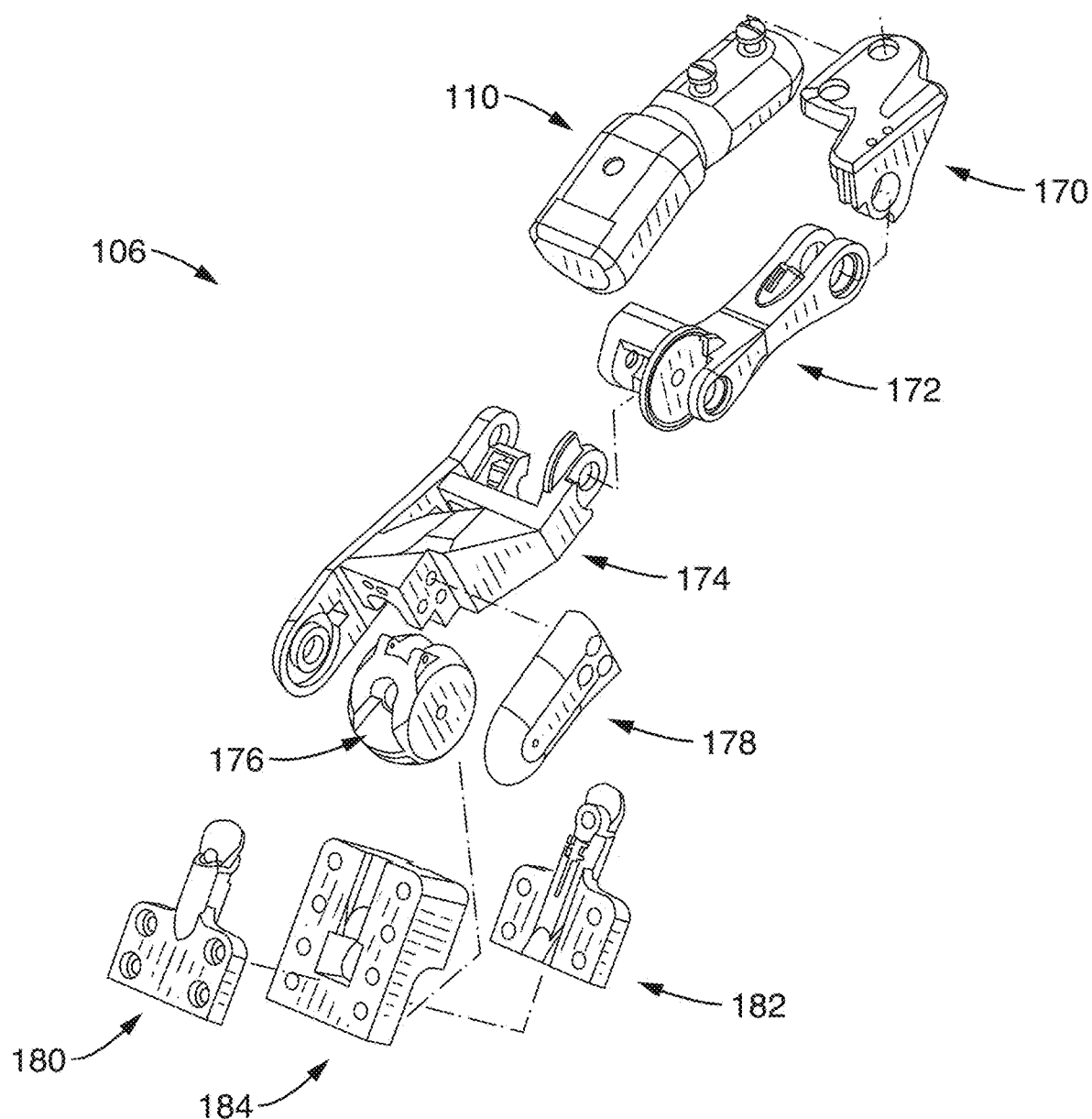
FIG. 14 is an exploded view of the robotic mechanism of FIG. 11.

Referring back to FIG. 2, the pair of tendons 113 extends from the ratchet mechanism 116 to a strain gauge mechanism 114 that permits direct measurement of tension being applied to the pair of tendons 113. As shown in FIGS. 2 and 4, the strain gauge mechanism 114 includes a first stage pulley arrangement 132 that forms one part of a multi-stage pulley system 115 of the actuation unit 102. In some embodiments, the first stage pulley arrangement 132 includes a first pulley 158 engaged to the extensor tendon 126 and a second pulley 160 engaged to the flexor tendon 128 with the first and second pulleys 158 and 160 including a respective cantilevered feature 135 formed through a base plate 130 of the actuation unit 102.

Figure 18:
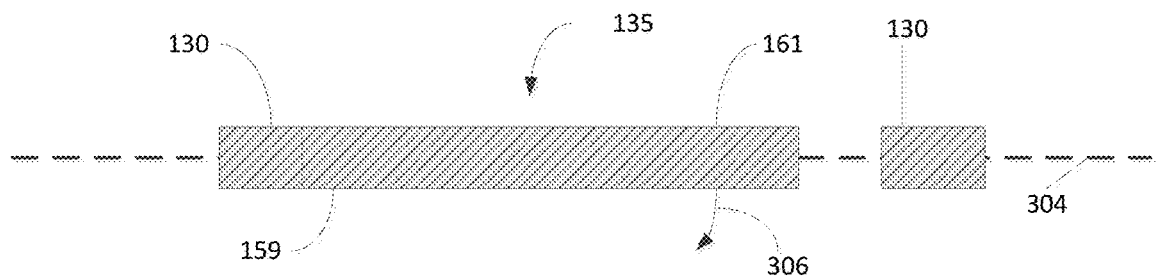
FIG. 18 is a cross-sectional view of the cantilevered feature taken along line 18-18 of FIG. 17.
Figure 19:
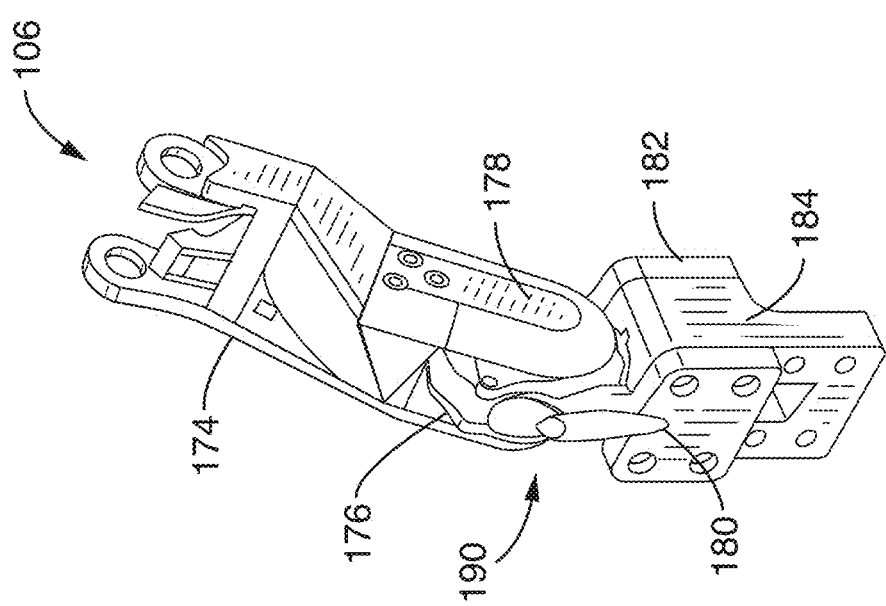
FIG. 19 is a perspective view of the robotic mechanism showing the proximal phalanx coupled to a knuckle component and the proximal articulating joint.

As shown in FIGS. 18 and 19, the cantilevered feature 135 defines a proximal end 159 that forms a portion of the base plate 130 and a distal free end 161 that is configured to bend in direction 306 relative to longitudinal axis 304 in response to any tension being applied to the tendons 113 (FIG. 2) engaged to the first stage pulley arrangement 132 (FIG. 2). In this manner, the cantilevered feature 135 allows for direct measurement of tension applied to the tendons 113 by measuring the degree of deflection in direction 306 which is detected by one or more strain gauges (FIG. 2) associated with the cantilevered feature 135. The strain gauges 151 are in communication with measuring circuitry 124, such as a Wheatstone bridge circuit, that detects and measures the degree of deflection of the cantilevered feature 135 that occurs when any tension is applied to the tendons 113 engaged to the first and second pulleys 158 and 160.

The representative components of the first and second pulleys 158 and 160 for the first stage pulley arrangement 132 are illustrated by the first pulley 158 shown in FIGS. 9 and 10. As shown, first pulley 158 includes a block 198 that defines a recess 193 configured to receive an axle 191 engaged to a bearing 189 disposed within a wheel 187 configured to engage a respective tendon 113. In addition, the axle 189 is configured to rotate about the recess 193 to allow the wheel 187 to concurrently rotate in response to movement by a tendon 113. In some embodiments, block 198 defines a plurality of channels 179 configured to engage a respective plurality of rods 183 for mounting the first pulley 158 to the base plate 130 of the actuation unit 102.

Figure 5:
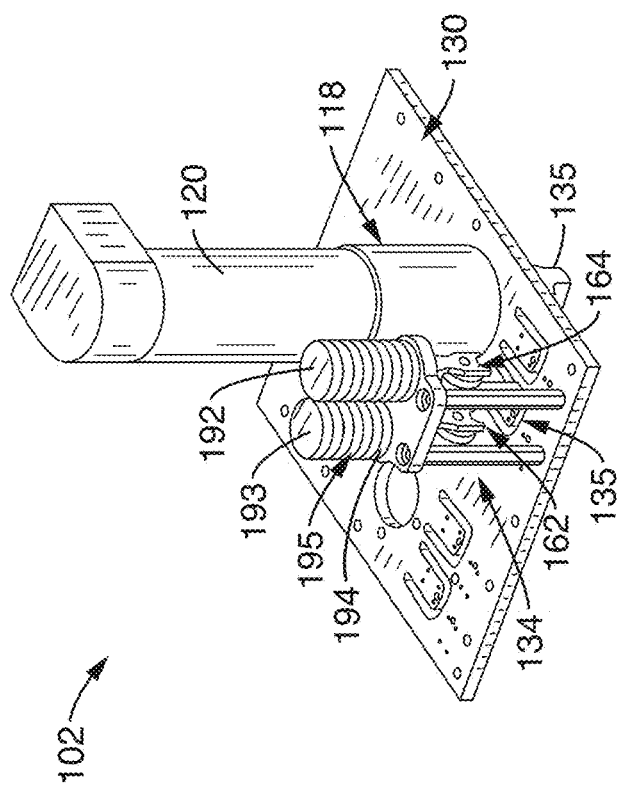
FIG. 5 is an opposing perspective view of the actuation unit of FIG. 4.

As shown in FIGS. 2, 4, 5, 7, and 8, in some embodiments the actuation system 100 includes a tension mechanism 112 for maintaining a degree of tension to the pair of tendons 113 and provide a shock absorbing function to the actuation unit 102 when tension is applied to the tendons 113. In one arrangement, the tension mechanism 112 includes a second stage pulley arrangement 134 having a first pulley 162 engaged to the extensor tendon 126 and a second pulley 164 engaged to the flexor tendon 128. As shown in FIGS. 7 and 8, for example the first pulley 162 may be biased by a first spring 194 mounted on a base 192 extending from base plate 130 (FIGS. 4 and 5) wherein the spring 194 applies a predetermined degree of tension to the extensor tendon 126 engaged to the first pulley 162. Similarly, as shown in FIG. 5, the second pulley 164 is engaged to a second spring 195 mounted on a base 193 extending from the base plate 130 wherein the second spring 195 applies a predetermined degree of tension to the flexor tendon 128 engaged to the second pulley 164. In addition, the first and second springs 194 and 195 also function as shock absorbers that absorb stress forces applied to the tendons 113.

Referring back to FIG. 2, the pair of tendons 113 extends from the second stage pulley arrangement 134 of the tension mechanism 112 to the third stage pulley arrangement 136 of the router mechanism 111. As shown in FIG. 4 the third stage pulley arrangement 136 includes a first pulley 166 engaged with the extensor tendon 126 and a second pulley 168 engaged with the flexor tendon 128 that allows the tendons 126 and 128 to be concurrently routed from a first orientation relative to the second pulley arrangement 134 to a second orientation relative to the third pulley arrangement 136. The router mechanism 111 also allows the tendons 113 to be oriented in a parallel manner relative to each other that avoids cross over or entanglement of the tendons 113, especially when a plurality of single actuation units 102 are combined together, thereby requiring a number of tendons 113 to be routed to the robotic mechanism 106. In addition, the router mechanism 111 allows for a low friction rerouting of the tendons 113.

Referring to FIGS. 11-14, in some embodiments the robotic mechanism 106 may be a robotic finger with articulating interconnected components for performing flexion and extension movements, while in other embodiments the robotic mechanism 106 may be different types of artificial limbs, such as a leg. In some embodiments, the robotic mechanism 106 includes an intermediate phalanx 172 having a distal interphalangeal joint 186 rotatably connected to an asymmetrical sensor attachment 170 for performing flexion and extension movements by the asymmetrical sensor attachment 170 and a proximal interphalangeal joint 188 rotatably connected to a proximal phalanx 174 for performing flexion and extension movements by the intermediate phalanx 172. In addition, the proximal phalanx 174 includes a proximal articulating joint 190 rotatably connected to a knuckle component 176 through a side piece 176 for performing adduction/abduction and flexion/extension movements by the proximal phalanx 174. As such, the knuckle component 176 at the proximal articulating joint 190 has adduction/abduction as well as flexion/extension capabilities. In some embodiments, the knuckle component 176 may be connected to first and second knuckle attachments 180 and 182 that are both engaged to a palm assembly 184. As used herein, the term "rotation" with respect to the distal interphalangeal joint 186, the proximal interphalangeal joint 188 and the proximal articulating joint 190 described above may include, but is not limited to, an adduction movement, an abduction movement, a flexion movement, and an extension movement.

Figure 15:
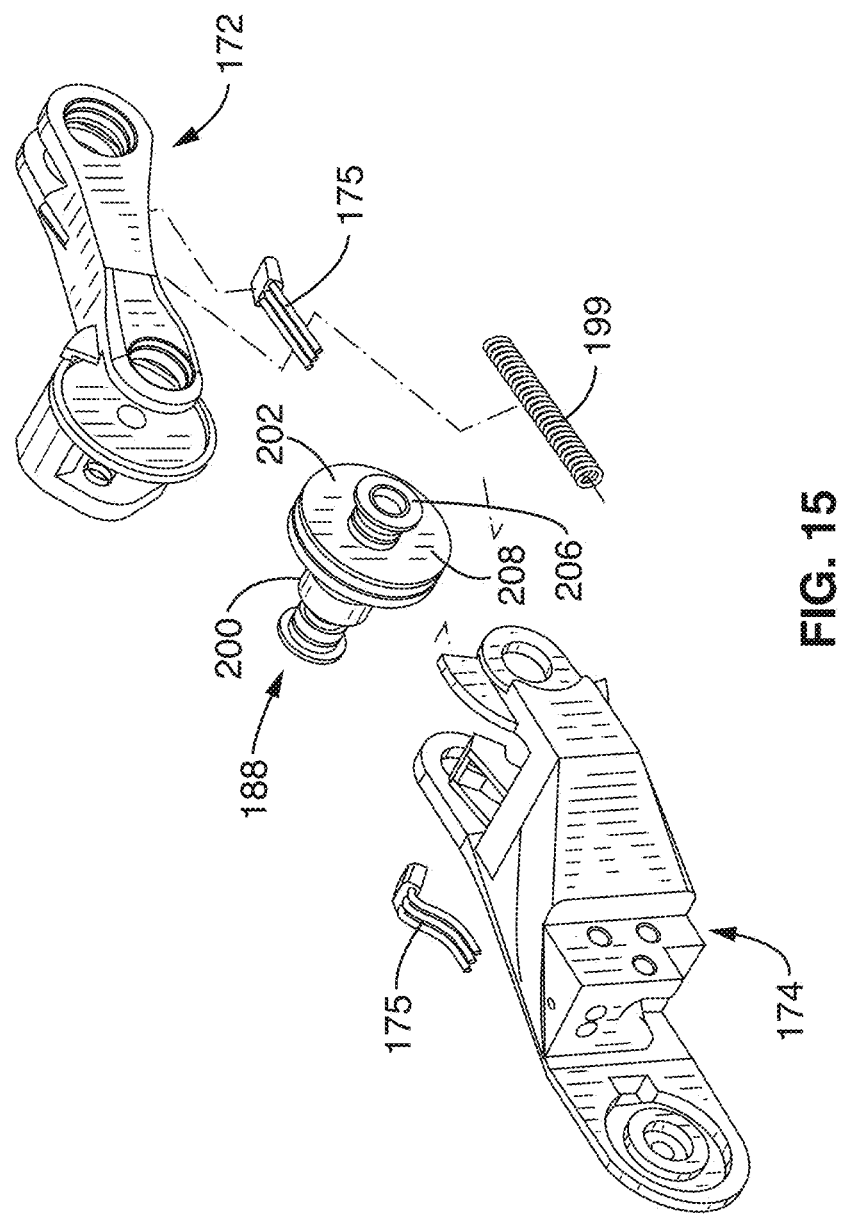
FIG. 15 is an exploded view showing a proximal interphalangeal joint connected to a proximal phalanx and an intermediate phalanx of the robotic mechanism of FIG. 11.

Referring to FIGS. 12 and 15, the proximal interphalangeal joint 188 may include an inner bearing 206 engaged to the proximal phalanx 174 and an outer bearing 208 engaged to the intermediate phalanx 172. In addition, a radial magnet 200 may be constrained to the orientation of the intermediate phalanx 172. In some embodiments, the radial magnet 200 is engaged to the outer bearing 208 and a Hall-effect sensor 175, in proximity to the radial magnet 200, measures the rotational position of the radial magnet 200 in order to determine the position of the proximal interphalangeal joint 188. In addition, a freely rotatable large pulley 202 may be engaged to the outer bearing 208 and is configured to route the tendons 113 through the various components of the robotic mechanism 106. In some embodiments, the distal interphalangeal joint 186 may include substantially the same components. Similarly, the distal interphalangeal joint 186 includes substantially the same arrangement of a wheel, pulley, magnet and bearings.

In some embodiments, a spring 199 may be embedded in the intermediate phalanx 172 with a tendon 113 engaged coaxially to the spring 199. When tension is applied to the tendon 113 one portion of the spring 199 compresses distally as the distal interphalangeal joint 186 is flexed. As such, the spring 199 increases the force required to actuate the distal interphalangeal joint 186, which is necessary due to the coupling between the distal interphalangeal joint 186 and the proximal interphalangeal joint 188. This arrangement ensures that the proximal interphalangeal joint 188, when unobstructed, will always actuate prior to actuation of the distal interphalangeal joint 188.

Figure 20:
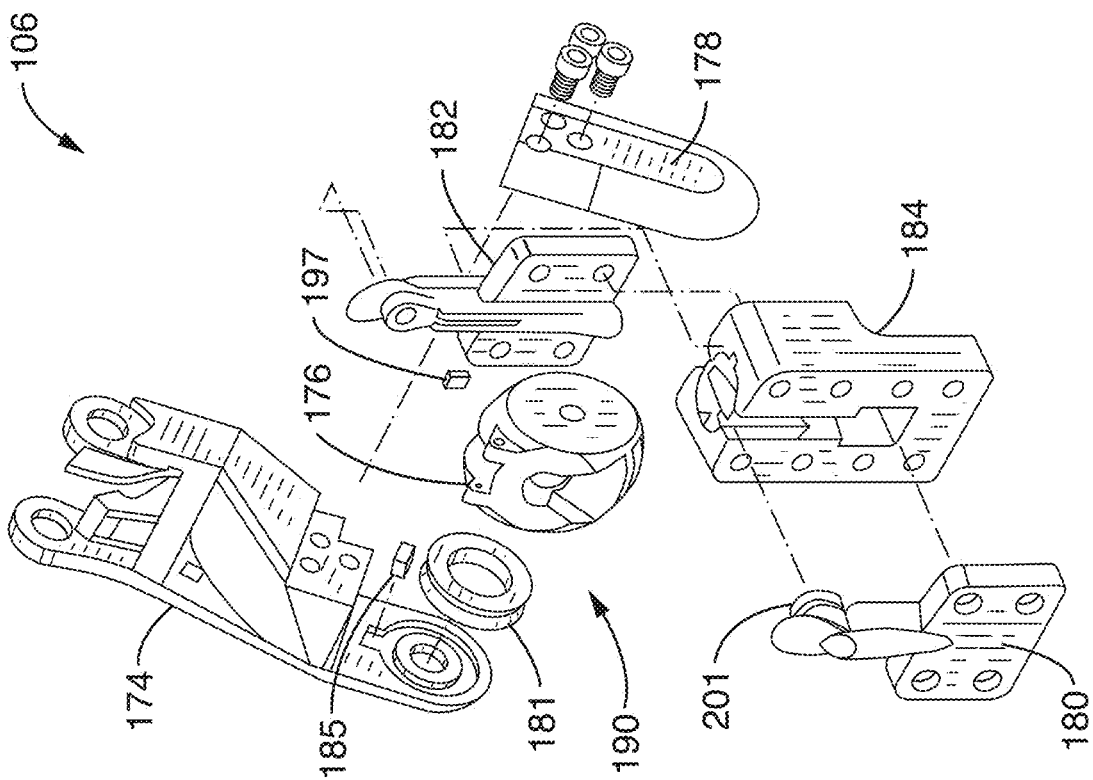
FIG. 20 is an exploded view of the robotic mechanism showing the proximal phalanx, knuckle component and proximal articulating joint.

Referring to FIGS. 19 and 20, the proximal articulating joint 190 includes a ring magnet 181 rigidly attached to the knuckle component 176. A first Hall-effect sensor 185 is mounted to the ring magnet 181 and is attached to the proximal phalanx 174 such that the Hall-effect sensor 201 travels with the ring magnet 181 when the ring magnet 181 is rotated to measure the flexion/extension of the proximal articulating joint 190. In addition, a second Hall-effect sensor 197 is attached to the square slot defined on the upper portion of the second knuckle attachment 182. The second Hall-effect sensor 197 measures the movement of the ring magnet 181 inside the knuckle component 176. The knuckle component 176 is held in place when both first and second knuckle attachments 180 and 182 are secured to the palm assembly 184. In assembly, the proximal phalanx 174 is secured to the knuckle component 176 when the side piece 178 is engaged to the proximal phalanx 174. In some embodiments, one or more bearings, such as bearing 201, may be press fit to the movement structural elements of the proximal articulating joint 190.

As shown in FIG. 12, when the robotic mechanism 106 is assembled, the symmetrical proximal phalanx 174 is aligned along a first longitudinal axis 300, which is the center line defined by the robotic mechanism 106, while the asymmetrical sensor attachment 170 and intermediate phalanx 172 are aligned along a second longitudinal axis 302, which is offset and parallel to the first longitudinal axis 300. This alignment of the proximal phalanx 174 along the first longitudinal axis 300 and the intermediate phalanx 172 and sensor attachment 170 along the second longitudinal axis 302 defines an unobstructed area between the sensor attachment 170 and the proximal phalanx 174 that is dimensioned to allow the sensor 110 to be disposed and aligned along the center line or first longitudinal axis 300. As such, the robotic mechanism 106 is configured to permit a larger sensor 110 than would otherwise be allowed if no asymmetrical component were interconnected to the proximal phalanx 174.

Figure 16:
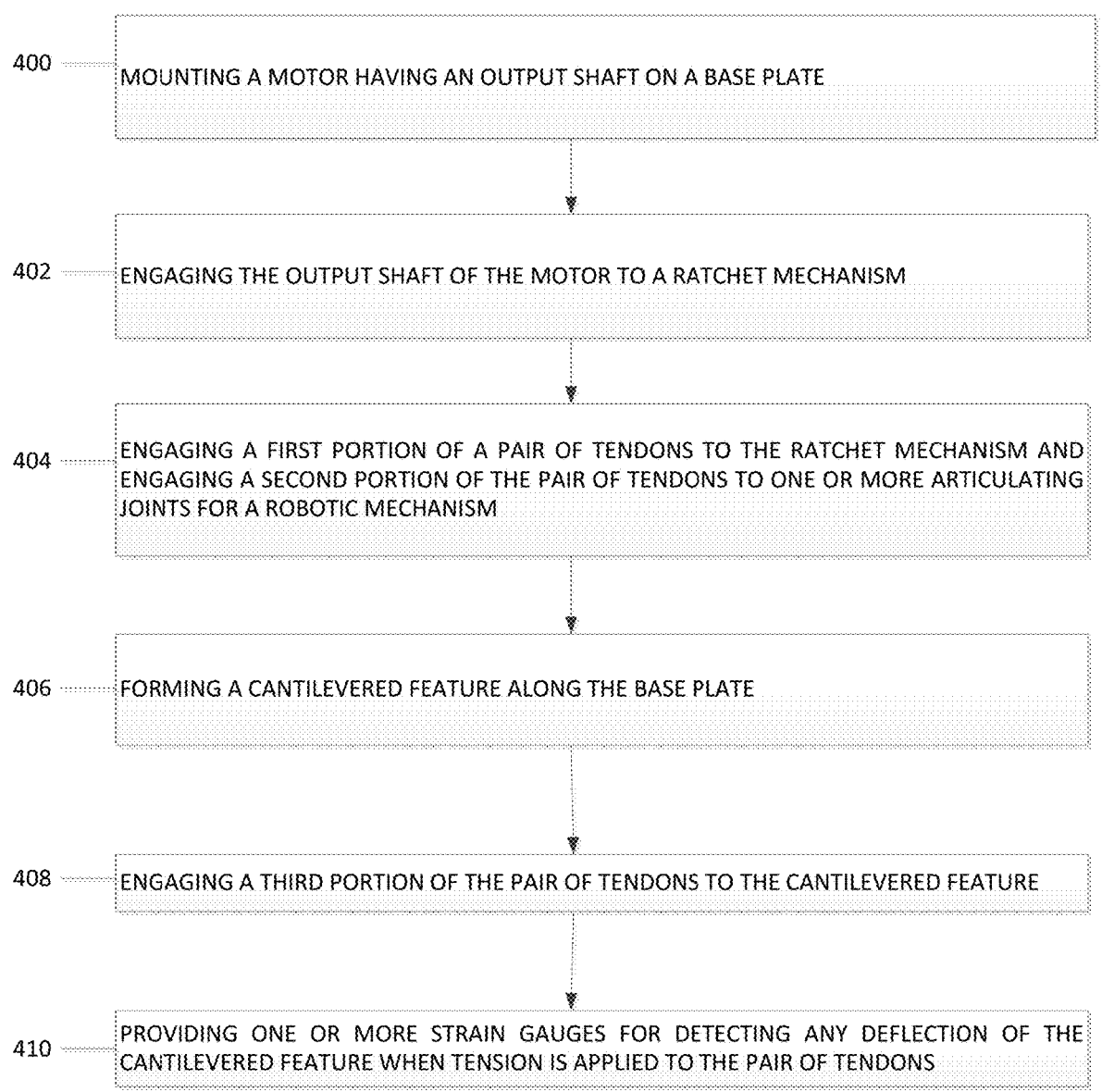
FIG. 16 is a flow chart illustrating one method for manufacturing the actuation unit of FIG. 4.
Figure 17:
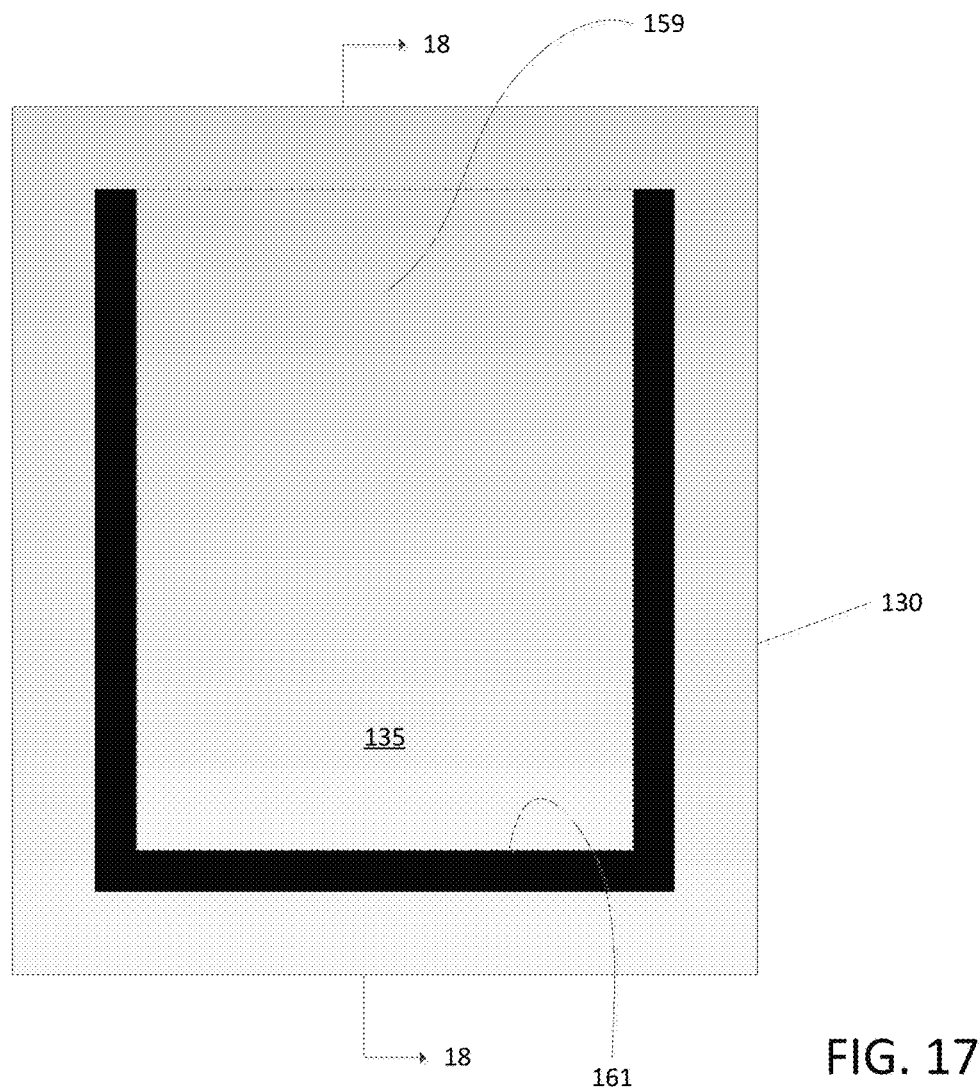
FIG. 17 is a simplified illustration showing the cantilevered feature for the strain gauge mechanism.

Referring to FIG. 16, a flow chart illustrates one method for manufacturing one embodiment of the actuation system 100. At block 400, mounting a motor 120 having an output shaft 137 on a base plate 130. At block 402, engaging the output shaft 137 of the motor 120 to a ratchet mechanism 116. At block 404, engaging one portion of a pair of tendons 113 to the ratcheting mechanism 116 and another portion of the pair of tendons 113 to one or more articulating joints for a robotic mechanism 106. At block 406, forming a cantilevered feature 135 along the base plate 130. At block 408, engaging the pair of tendons 113 to the cantilevered feature 135. At block 410, providing a strain gauge 151 for detecting movement of the cantilevered feature 135 when tension is applied to the tendons 113.

While a particular order of actions is illustrated in FIG. 16, these actions may be performed in other temporal sequences. For example, two or more actions depicted in FIG. 16 may be performed sequentially, concurrently, or simultaneously. Alternatively, two or more actions depicted may be performed in reverse order. Further one or more actions in FIG. 16 may not be performed at all. The apparatus, methods, and articles of manufacture described herein are not limited in this regard.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A robotic mechanism comprising:
    an intermediate phalanx having a distal articulating joint rotatably connected to an asymmetrical sensor attachment for performing flexion and extension movements by the asymmetrical sensor attachment and a proximal articulating joint rotatably connected to a symmetrical proximal phalanx for performing flexion and extension movements by the intermediate phalanx;
    a knuckle component having an articulating joint rotatably connected to the symmetrical proximal phalanx for rotation of the symmetrical proximal phalanx; and
    a longitudinal space collectively defined by the asymmetrical sensor attachment, the intermediate phalanx, and the symmetrical proximal phalanx which are configured to receive a sensor component, wherein the longitudinal space is aligned along a first longitudinal axis defined by a center line of the robotic mechanism;
    wherein the asymmetrical intermediate phalanx is aligned along a second longitudinal axis that is in an offset and parallel orientation relative to the first longitudinal axis.

2. The robotic mechanism of claim 1, wherein the symmetrical proximal phalanx is aligned along the first longitudinal axis.

3. The robotic mechanism of claim 1, wherein rotation of the symmetrical proximal phalanx by the knuckle component comprises adduction/abduction and flexion/extension movements.

4. The robotic mechanism of claim 1, wherein the proximal articulating joint comprises a freely rotatable pully configured to route one or more tendons.

5. A method of operating a robotic mechanism, the method comprising:
    rotatably connecting an asymmetrical sensor attachment to a distal articulating joint of an intermediate phalanx and rotatably connecting a proximal articulating joint rotatably to a symmetrical proximal phalanx;
    rotatably connecting an articulating joint of a knuckle component to the symmetrical proximal phalanx; and
    receiving a sensor component within a longitudinal space collectively defined by the asymmetrical sensor attachment, the intermediate phalanx, and the symmetrical proximal phalanx, wherein the longitudinal space is aligned along a first longitudinal axis defined by a center line of the robotic mechanism;
    performing flexion and extension movements by the asymmetrical sensor attachment via the distal articulating joint of the intermediate phalanx;
    performing flexion and extension movements by the intermediate phalanx via the proximal articulating joint; and
    rotating the symmetrical proximal phalanx by the articulating joint of a knuckle component
    wherein the asymmetrical intermediate phalanx is aligned along a second longitudinal axis that is in an offset and parallel orientation relative to the first longitudinal axis.

6. The method of claim 5, wherein the symmetrical proximal phalanx is aligned along the first longitudinal axis.

7. The method of claim 5, wherein rotation of the symmetrical proximal phalanx by the knuckle component is in adduction/abduction and flexion/extension.

8. The robotic mechanism of claim 5, wherein the proximal articulating joint comprises a freely rotatable pully configured to route one or more tendons.

* * * * *